United States Patent
Sadhu

(10) Patent No.: US 11,321,163 B2
(45) Date of Patent: May 3, 2022

(54) DEVICE AND METHOD FOR MONITORING FUNCTIONAL SAFETY IN INTEGRATED CIRCUITS (ICS)

(71) Applicant: WIPRO LIMITED, Bangalore (IN)

(72) Inventor: Radha Krishna Moorthy Sadhu, Bangalore (IN)

(73) Assignee: Wipro Limited, Bangalore (IN)

( * ) Notice: Subject to any disclaimer, the term of this patent is extended or adjusted under 35 U.S.C. 154(b) by 107 days.

(21) Appl. No.: 16/835,157

(22) Filed: Mar. 30, 2020

(65) Prior Publication Data

US 2021/0303379 A1 Sep. 30, 2021

(30) Foreign Application Priority Data

Mar. 26, 2020 (IN) .............................. 202041013254

(51) Int. Cl.
*G06F 11/00* (2006.01)
*G06F 11/07* (2006.01)
(52) U.S. Cl.
CPC ........ *G06F 11/079* (2013.01); *G06F 11/0757* (2013.01); *G06F 11/0769* (2013.01)
(58) Field of Classification Search
CPC . G06F 11/079; G06F 11/0757; G06F 11/0769
See application file for complete search history.

(56) References Cited

U.S. PATENT DOCUMENTS

| 10,592,322 B1* | 3/2020 | Seshadri ............. G06F 11/3006 |
| 2007/0006030 A1* | 1/2007 | Wagner ............... G06F 11/0757 |
| | | 714/25 |
| 2014/0200699 A1* | 7/2014 | Vincelli ............... G06F 11/008 |
| | | 700/105 |
| 2016/0224442 A1* | 8/2016 | Sanghi ................ G06F 13/4022 |
| 2017/0031795 A1* | 2/2017 | Roberston ........... G06F 11/0757 |
| 2019/0286091 A1* | 9/2019 | Yamahira ........... G05B 23/0237 |
| 2019/0289524 A1* | 9/2019 | Wohlgemuth ........ H04W 40/08 |
| 2020/0361487 A1* | 11/2020 | Sakamoto ............... B60R 16/02 |

(Continued)

FOREIGN PATENT DOCUMENTS

| CN | 205787747 U | 12/2016 |
| CN | 104977523 B | 9/2019 |

*Primary Examiner* — Jonathan D Gibson

(74) *Attorney, Agent, or Firm* — Finnegan, Henderson, Farabow, Garrett & Dunner, LLP

(57) ABSTRACT

A Functional Safety Timer (FST) and method of for monitoring functional safety in Integrated Circuits (ICs) is disclosed. The FST includes hardware based counter for counting programmed number of cycles associated with an event of peripheral device. The FST includes first logic circuit and second logic circuit. The first logic circuit receives first trigger of peripheral device. In response to first trigger, the counter is initiated by first logic circuit. The second logic circuit receives second trigger of peripheral device. In response to second trigger, the counter being initiated is terminated by the second logic circuit. Further, the FST includes a hardware based comparator for comparing the number of cycles counted by the hardware based counter with a threshold time associated with the event and a plurality of programmable registers for determining one or more faults associated with the event based on result of the comparison and sequence of events.

10 Claims, 4 Drawing Sheets

(56) References Cited

U.S. PATENT DOCUMENTS

2021/0159688 A1* 5/2021 Lassen ............... H03K 19/0005
2021/0218656 A1* 7/2021 Meier .................. H04J 3/0667
2021/0271537 A1* 9/2021 Gong ................. G06F 11/0787

* cited by examiner

DEVICE AND METHOD FOR MONITORING FUNCTIONAL SAFETY IN INTEGRATED CIRCUITS (ICS)

TECHNICAL FIELD

The present subject matter is related in general to safety device and System on Chips (SoC), more particularly, but not exclusively to device and a method for monitoring functional safety in Integrated Circuits (ICs).

BACKGROUND

With increase in demand for autonomous vehicle, there is a need for robust and functionally safe electronic components. A standard, ISO26262 has been introduced to ensure functional safety in automotive designs and with a recent update in ISO26262 for semiconductors, there is a need to enhance chip design components to ensure the functional safety in chip designs.

A generic timer module is a typical component in any chip design especially in System-on-Chip (SoC) designs and is typically used to schedule events by software. Currently, same generic timers are extended to be used to monitor certain events and check stuck-at behavior of certain interfaces/modules/protocols in the chip design to ensure the functional safety. However, these generic or general purpose timers are not specific for functional safety. Hence, these timers may not cover all required functionality in hardware design and needs support from software. In addition, the general purpose or generic timer incurs latencies and additional risks due to inter dependencies on other modules in the SoC such as, Central Processing Unit (CPU), Random Access Memory (RAM), interconnect to execute instructions in ensuring the functional safety.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a Functional Safety Timer (FST) for monitoring functional safety in Integrated Circuits (ICs). The FST comprises a hardware based counter configured for counting a programmed number of cycles associated with an event of a peripheral device. FST includes a first logic circuit and a second logic circuit. The first logic circuit is configured for receiving a first trigger of the peripheral device. In response to the first trigger, the counter is initiated by the first logic circuit. The second logic circuit is configured for receiving a second trigger of the peripheral device. In response to the second trigger, the hardware based counter being initiated is terminated by the second logic circuit. Further, the FST includes a hardware based comparator for comparing the number of cycles counted by the hardware based counter with a threshold time associated with the event and a plurality of programmable registers for determining one or more faults associated with the event based on a result of the comparison.

In an embodiment, the present disclosure may relate to method for monitoring functional safety in Integrated Circuits (ICs). The method comprises receiving a first trigger from a first peripheral device to initiate a hardware based counter of the FST for an event associated with the first peripheral device. The method includes receiving a second trigger from a second peripheral device to terminate the initiated hardware based counter. Further, the method includes comparing a number of cycle counted by the hardware based counter with a threshold time associated with the event upon terminating the hardware based counter. Based on a result of comparison, the method includes determining one or more faults associated with the event.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
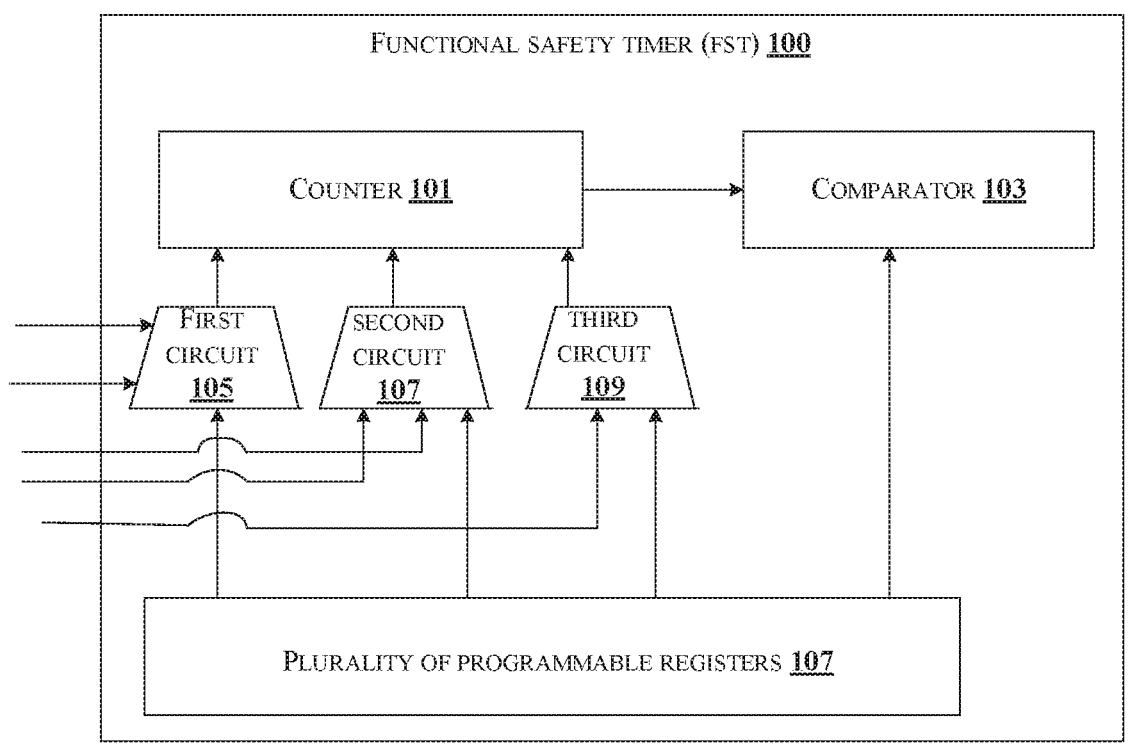
FIG. 1a illustrates a block diagram of a Functional Safety Timer (FST) for monitoring functional safety in Integrated Circuits (ICs) in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a Functional Safety Timer (FST) and a method for monitoring functional safety in Integrated Circuits (ICs). In Existing systems, generic timers are extended to be used to monitor certain events and check stuck-at behavior of certain interfaces/modules/protocols in the chip design to ensure the functional safety. However, such generic timers are not specific for functional safety. Therefore, these timers may not cover all required functionality in hardware design and may require support from software triggers. In addition, the generic timers incur latencies and additional risks due to inter dependencies on other modules in the ICs. Therefore, to overcome these issues, the present disclosure provides the FST designed especially to monitor functional safety of chip design interfaces, protocols and components. The FST may be initiated and terminated based on hardware trigger and may determine one or more faults such as, transient faults and stuck-at faults.

Embodiments of the present disclosure have several advantages. For example, the FST may be used with any protocol and interface monitoring and hence reduces complexity on other IP designs. Further, the FST removes dependences on software trigger to determine one or more fault conditions and dependencies on other components involved in execution of such software triggers. In addition, the FST may be used across chip along with various interfaces, modules by connecting one or more start/stop/clear trigger events. Hence, usage of FST avoids customization of other IP modules involving one or more risks.

FIG. 1a illustrates a block diagram of a Functional Safety Timer (FST) for monitoring functional safety in Integrated Circuits (ICs) in accordance with some embodiments of the present disclosure.

A Functional Safety Timer (FST) 100 is disclosed in FIG. 1a. The FST 100 may be embedded on a System on Chip (SOC) (as disclosed in FIG. 1b). The FST is a timer designed specifically for monitoring functional safety in ICs. In an embodiment, functional safety may refer as part of overall safety of a system or piece of equipment which depends on automatic protection operating correctly in response to inputs or failure in a predictable manner. For example, functional safety for automotive equipment which may be applicable throughout lifecycle of automotive electronic and electrical safety-related systems. For instance, electrical safety for Anti-lock Braking system (ABS) and the like. The FST 100 includes a hardware based counter 101 which is configured for counting a programmed number of cycles associated with an event of a peripheral device (not shown in FIG. 1a explicitly, covered in FIG. 1b). Alternatively, the event may also be from an internal processing block of the IC. In an embodiment, the event of the peripheral device may be any functionality associated with the peripheral device. Further, the FST 100 includes a plurality of logic circuits such as, a first logic circuit 105, a second logic circuit 107 and a third logic circuit 109. In an embodiment, the plurality of logic circuits may be a multiplexer.

During processing on any functionality in the peripheral device, the first logic circuit 105 may receive a first trigger of the peripheral device. The first trigger may include an input to initiate the counter 101. Thus, on receiving the first trigger, the first logic circuit 105 may initiate the counter 101. The counter 101 may initiate counting the number of cycles for the triggered event upon initiation.

Once the event is to be terminated, the second logic circuit 107 may receive a second trigger of the peripheral device. The second trigger may relate to termination of the counting by the counter 101. Thus, on receiving the second trigger, the second logic circuit 107 may terminate the initiated counter 101 in response to the second trigger. In an embodiment, the counter 101 may be cleared by the third logic circuit 109 on receiving a new trigger input to initiate or terminate the counter 101 or on receiving exclusively a trigger for clearing the counter 101.

Further, the FST 100 includes a hardware based comparator 103 and a plurality of programmable registers 110. The comparator 103 may compare the number of cycles counted by the counter 101 at end of the termination. The comparator 103 may compare (i) the number of cycle with a threshold time associated with the event, which may be received from one of the plurality of programmable registers 110 and also (ii) compare the order of the events with a predefined sequence. In an embodiment, each event may be associated with a threshold time depending on the type of event. Thus, based on the comparison of either (i) the number of cycle with a threshold time or (ii) on the order of the events with a predefined sequence, the plurality of programmable registers 110 may determine one or more faults associated with the event. The one or more faults may include, such as, transient faults such as, UnExpectedStop/Ack, RepeatStart and stuck-at faults such as, NoStopOrAck of the peripheral device/internal processing block.

For an instance, if the number of cycle counted by the counter 101 is greater than the threshold time, the plurality of programmable registers 110 may indicate the one or more faults as stuck-at faults (i.e., NoStopOrAck fault). In another instance, if the order of events are not in predefined sequence, the plurality of programmable registers 110 may indicate the one or more faults as transient faults (i.e., UnExpectedStop/Ack, RepeatStart). In an embodiment, the FST 100 may include a transmitter for transmitting information about the one or more faults to a fault control unit (not shown in FIG. 1a explicitly) in the IC.

Figure 1B:
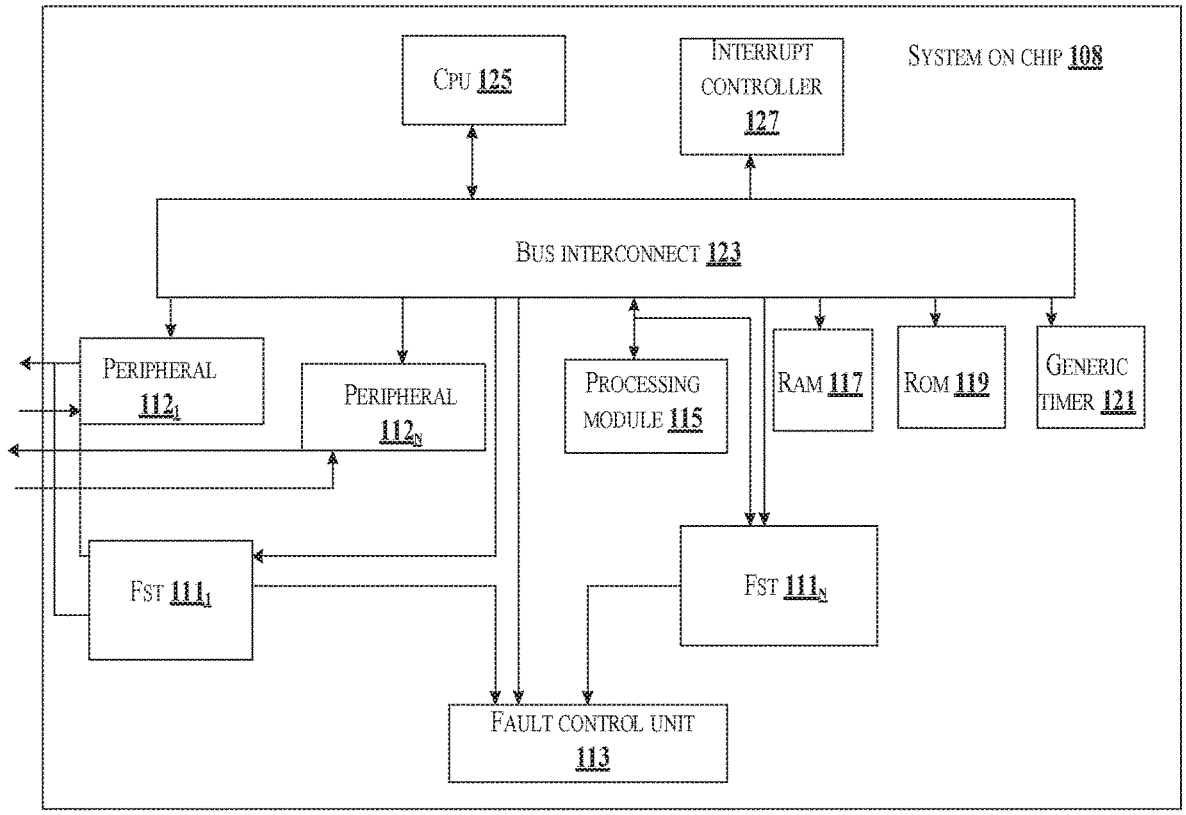
FIG. 1b shows an exemplary embodiment of a System on Chip (SoC) with plurality of FST instances in accordance with some embodiments of the present disclosure.

In an embodiment, the FST 100 may include a plurality of counters and comparators for a plurality of events associated with plurality of peripheral devices/internal processing blocks. In an embodiment, a Soc may include a plurality of FST 100 depending on requirement and implementation as shown in FIG. 1b. FIG. 1b shows an exemplary embodiment of a System on Chip (SoC) with plurality of FST instances in accordance with some embodiments of the present disclosure. FIG. 1b discloses a System on Chip (SoC) 108 which encompasses component of any electronic system. In an embodiment, the SoC 108 is a single chip for complete system implementation, with built-in embedded input/output interfaces, control units, processors and data-processing elements. As shown, the SoC 108 includes a Central Processing Unit (CPU) 125, memory units like, RAM 117 and ROM 119 to boot and execute, an interrupt controller 127 connected through a bus interconnect 123 to corresponding plurality of peripheral ($112_1$ to $112_N$) associated to one or more devices. In an embodiment, a peripheral controller may operate the peripherals 112 connected to the SoC 108. For example, a Controller Area Network (CAN) controller operates functionality of connecting the device in a CAN network and communicate with other devices on the network. Further, the peripheral 112 perform various operations like data input/output across the SoC 108 to other devices.

Figure 2A:
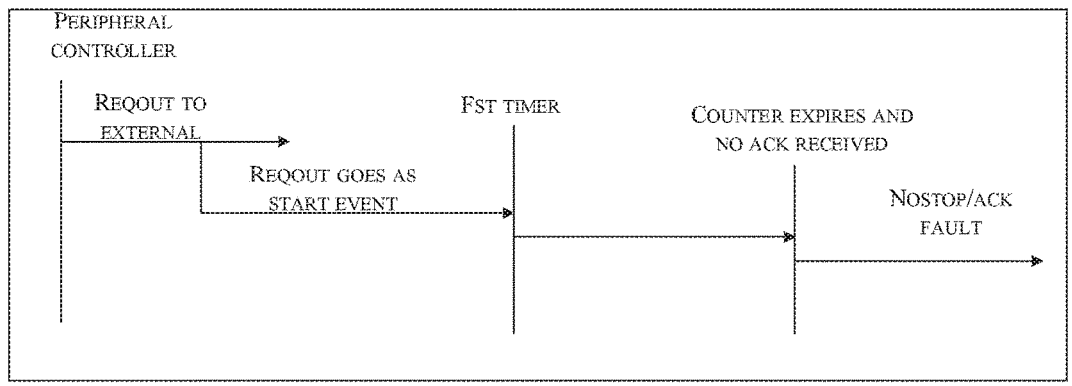
FIG. 2a shows an exemplary embodiment for detecting stuck-at fault using FST in accordance with some embodiments of the present disclosure.

The interrupt controller 127 may collect various interrupts generated by different blocks and sends a single interrupt to the CPU 125. In an embodiment, the bus interconnect 123 connects one or more blocks in the Soc 108. In an embodiment, the bus interconnect 123 may be used to build an SOC with one or more functional blocks configured through a master-slave protocol. The bus interconnect 123 may be a custom crossbar or a switch design which may support multiple AXI masters and slaves. Further, the Soc 108 includes a processing module 115, a plurality of FST ($111_1$ to $111_N$), a fault control unit 113 and a generic timer 121. The processing module 115 may process data to be received or to be transmitted out. The plurality of FST 111 may be used for one or more events of the peripheral devices 112 or of internal processing blocks. For instance, in FIG. 1b, a FST $111_1$ is used along with peripheral $112_1$ for external interface to monitor external request and acknowledgment. The FST $111_1$ may determines one or more faults associated with the peripheral $112_1$ such as, NoStopOrAck which is a fault to detect any stuck-at conditions on external acknowledgment signal coming in or an UnexpectedStopOrAck, which is a fault condition to detect any transient faults on the acknowledgment signal coming in from the external Interface. FIG. 2a shows an exemplary embodiment for detecting stuck-at fault using FST in accordance with some embodiments of the present disclosure.

FIG. 2a shown an exemplary flowchart for detecting the NoStop/Ack_Fault on an acknowledgment input coming to the peripheral $112_1$. Consider, the FST $111_1$ in the SOC 108 is configured to monitor the stuck-at fault on ack input coming to the peripheral $112_1$ from external device, which is expected to respond when the request is sent out from peripheral $112_1$. The FST $111_1$ in such case may count clocks for a pre-configured number after receiving an initiation request and generates the fault if terminate trigger is not received within the configured clock counts.

In this case, the peripheral $112_1$ may provide a request output to the external device, and the same request out (ReqOut) is connected to the FST $111_1$. Thus, the request output may be transmitted by the peripheral $112_1$ as the first trigger to the FST $111_1$ to initiate the counter of the FST $111_1$. Whenever an acknowledgement is sent by the external device to the peripheral $112_1$ on accepting the request, the same trigger or signal may be provided to the FST $111_1$ as the second trigger to stop the counter. In above case, consider if the acknowledgement (Ack) signal is not received. In such case, the second trigger or terminate signal may not be received by the FST $111_1$, as the Ack signal may be stuck at zero. Hence, the counter in the FST $111_1$ may expire and generates NoStop/Ack_fault. The fault detected at the FST $111_1$ may be transmitted to the fault control unit 113.

The fault control unit 113 may internally collect one or more faults and generate a final fault output for the SoC 108 to provide to a user. For example, consider the final fault is associated with an LED light on dashboard of a car, indicating a fault occurred in one of an ECUs in power steering SoC. Hence, a driver of the car may take appropriate action to stop the car.

Figure 2B:
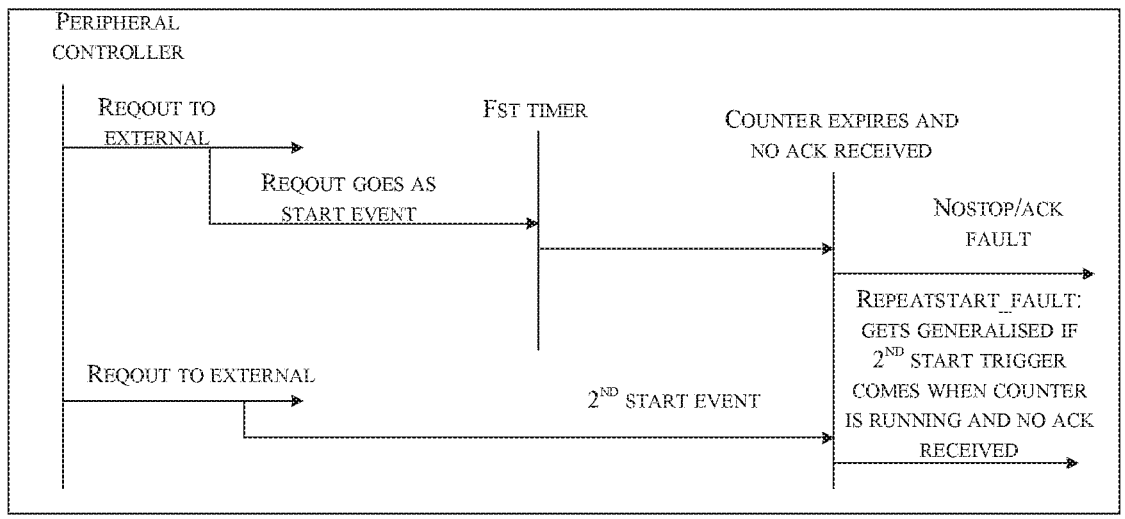
FIGS. 2b-2c show exemplary embodiments for detecting transient fault using FST in accordance with some embodiments of the present disclosure.
Figure 2C:
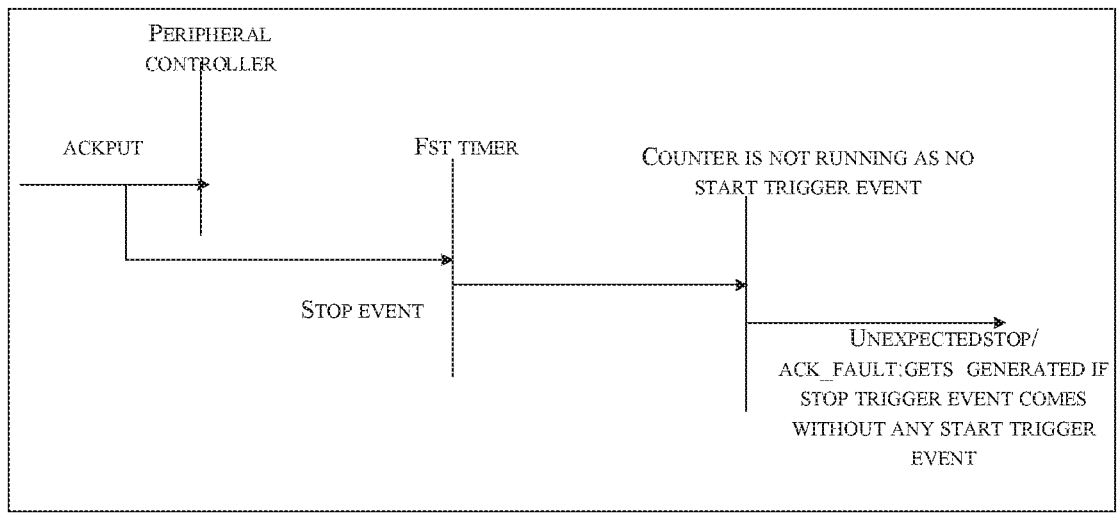

Similarly, FIG. 2b-2c show exemplary embodiments for detecting transient fault using FST in accordance with some embodiments of the present disclosure. FIG. 2b illustrates detection of a RepeatStart_Fault on a request signal of the peripheral $112_1$. In this case, The FST $111_1$ may be configured to monitor the transient fault on request output coming from the peripheral $112_1$ to external device, which is expected to respond when the request is transmitted from the peripheral $112_1$. The FST $111_1$ in such case may count the clocks for a configured number of clock cycles after receiving the first trigger connected to request signal from the peripheral $112_1$. In an embodiment, since a single outstanding request out is expected, hence a new request may be followed only after Ack is received. In case, if the peripheral $112_1$ generates a new request out signal due to a transient fault, before Ack is received. In such case, the FST $111_1$ may trigger the fault as the RepeatStart fault, when the counter is still running and the second trigger for terminating the counter is not received. Likewise, in FIG. 2c, the first logic circuit and second logic circuit of the FST $111_1$ are connected to request output and Ack input of the peripheral $112_1$. An Ack input is expected only when a request output i.e. the first trigger is received. Consider, if the second logic circuit, which is connected to Ack input is asserted without any first trigger for counter initiation (i.e. request out of peripheral $112_1$). In such case, the FST $111_1$ may detect an unexpected stop/second trigger and rises it as UnexpectedStop/Ack Fault.

Returning to FIG. 1b, the other FST of the plurality of FST 111 may be associated with internal processing block to monitor for example, bus interface request-Ack handshake which is completely internal. The fault control unit 113 may receive the one or more faults from each of one or more FST 111 and other safety logics in the Soc 108 and generates a final fault output to indicate faults detected on the Soc 108 to the user for taking corrective actions.

Figure 3:
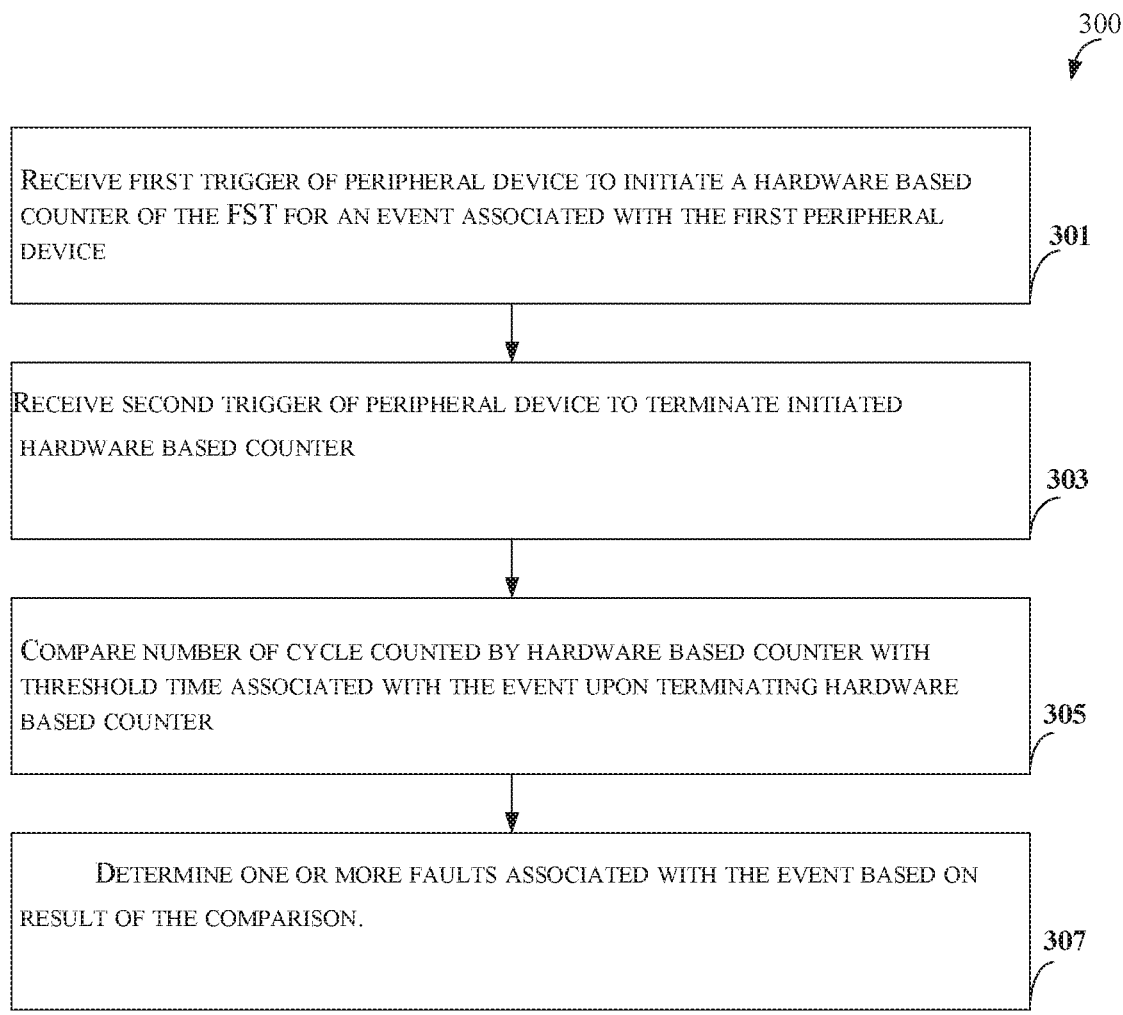
FIG. 3 illustrates a flowchart showing a method for monitoring functional safety in Integrated Circuits (ICs) in accordance with some embodiments of present disclosure.

FIG. 3 illustrates a flowchart showing a method for monitoring functional safety in Integrated Circuits (ICs) in accordance with some embodiments of present disclosure.

As illustrated in FIG. 3, the method 300 includes one or more blocks for monitoring functional safety in Integrated Circuits (ICs). The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the first trigger is received by the first logic circuit 105 of the peripheral device/internal processing block of the SoC 108 to initiate the counter 101 of the FST 100 for the event associated with the peripheral device.

At block 303 the second trigger is received by the second logic circuit 107 of the peripheral device/internal processing block to terminate the initiated counter 101.

At block 305, the number of cycle counted by the counter 101 is compared by the comparator 103 with the threshold time associated with the event upon terminating the counter 101.

At block 307, the one or more faults associated with the event are determined by the plurality of programmable registers 110 based on the result of the comparison. In an embodiment, the FST 100 may be implemented with triple redundant flops for the plurality of programmable registers 110. This improves overall diagnostic coverage of the FST 100 against the one or more faults within the logic. In an embodiment, in a single chip, multiple FST 100 may be initiated to monitor different protocols/modules/interfaces. In an embodiment, the one or more faults may include the transient faults and the stuck-at fault. In an embodiment, information about the one or more faults is transmitted to the fault control unit 113. The fault control unit 113 receives the one or more faults from each of one or more FST and other safety logics in the SoC 108 and generates the final fault output to indicate faults detected to the user for taking corrective actions.

Advantages of the Present Disclosure

An embodiment of the present disclosure facilitates in monitoring functional safety in Integrated Circuits (ICs).

An embodiment of the present disclosure may provide the FST which may be used with any protocol and interface monitoring and hence reduces complexity on other IP designs. Further, the FST removes dependences on software trigger to determine one or more fault conditions and dependencies on other components involved in execution of such software triggers. In addition, the FST may be used across chip along with various interfaces, modules by connecting one or more start/stop/clear trigger events. Hence, usage of FST avoids customization of other IP modules involving one or more risks.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs. PROMs, RAMs, DRAMs, SRAMs. Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment". "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Functional Safety Timer |
| 101 | Counter |
| 103 | Comparator |
| 105 | First logic circuit |
| 107 | Second logic circuit |
| 109 | Third logic circuit |
| 108 | System on Chip |
| 110 | Plurality of programmable registers |
| 111 | Plurality of FST |
| 113 | Fault control unit |
| 115 | Processing module |
| 117 | RAM |
| 119 | ROM |
| 121 | Generic timer |
| 125 | Bus interconnect |
| 125 | CPU |
| 127 | Interrupt controller |

What is claimed is:

1. A Functional Safety Timer (FST) for monitoring functional safety in Integrated Circuits (ICs), comprising:
   a hardware based counter configured for counting a programmed number of cycles associated with at least one event of a peripheral device;
   a first logic circuit configured for receiving a first trigger of the peripheral device, wherein the hardware based counter is initiated by the first logic circuit in response to the first trigger;
   a second logic circuit configured for receiving a second trigger of the peripheral device, wherein the hardware based counter being initiated is terminated by the second logic circuit in response to the second trigger;
   a hardware based comparator configured for comparing:
      the number of cycles counted by the hardware based counter with a threshold time associated with the at least one event, and
      an order of events with a predefined sequence, wherein the order of events pertains to the at least one event; and
   a plurality of programmable registers configured for determining one or more faults associated with the at least one event based on a result of the comparison.

2. The FST as claimed in claim 1, wherein the one or more faults comprises transient faults and stuck-at faults of the peripheral device.

3. The FST as claimed in claim 1 comprises a transmitter for transmitting information about the one or more faults to a fault control unit in the IC wherein the fault control unit receives the one or more faults from each of one or more FST and other safety logics in the IC and generates a final fault output to indicate faults detected on the IC to a user for taking corrective actions.

4. The FST as claimed in claim 1 further comprises a third logic circuit configured for clearing count of the hardware based counter on at least one of, on receiving a new trigger input to initiate or terminate the hardware based counter and on a trigger for clearing the hardware based counter.

5. A method for monitoring functional safety of Integrated Circuits (ICs), the method comprising:
   receiving, by a Functional Safety Timer (FST), a first trigger of peripheral device to initiate a hardware based counter of the FST for at least one event associated with the peripheral device;
   receiving, by the FST, a second trigger of the peripheral device to terminate the initiated hardware based counter;
   comparing, by the FST:
      a number of cycles counted by the hardware based counter with a threshold time associated with the at least event upon terminating the hardware based counter, and
      an order of events with a predefined sequence, wherein the order of events pertains to the at least one event; and
   determining, by the FST, one or more faults associated with the at least one event based on result of the comparison.

6. The method as claimed in claim 5, wherein the one or more faults comprises transient faults and stuck-at faults of the peripheral device.

7. The method as claimed in claim 5 further comprising transmitting information about the one or more faults to a fault control unit in the IC.

8. The method as claimed in claim 7, wherein transmitting the information about the one or more faults to the fault control unit comprises receiving the one or more faults from each of one or more FST in the IC and generating a final fault output to indicate faults detected on the IC to a user for taking corrective actions.

9. The method as claimed in claim 5 further comprising clearing count of the hardware based counter on at least one of on receiving a new trigger input to initiate or terminate the hardware based counter and on receiving a trigger for clearing the hardware based counter.

10. The method as claimed in claim 5 further comprising halting the count in the hardware based counter based on a predefined condition.

* * * * *